(12) United States Patent
Bjerre et al.

(10) Patent No.: US 11,684,073 B2
(45) Date of Patent: Jun. 27, 2023

(54) FERMENTED MILK INOCULATED WITH BOTH LACTIC ACID BACTERIA (LAB) AND BACILLUS

(71) Applicant: Chr. Hansen A/S, Hoersholm (DK)

(72) Inventors: Karin Bjerre, Malmoe (SE); Mette Dines Cantor, Birkeroed (DK); Thomas Janzen, Broenshoej (DK); Patrick Derkx, Tikoeb (DK)

(73) Assignee: Chr. Hansen A/S, Hoersholm (DK)

( * ) Notice: Subject to any disclaimer, the term of this patent is extended or adjusted under 35 U.S.C. 154(b) by 1006 days.

(21) Appl. No.: 15/741,730

(22) PCT Filed: Jun. 30, 2016

(86) PCT No.: PCT/EP2016/065327
§ 371 (c)(1),
(2) Date: Jan. 3, 2018

(87) PCT Pub. No.: WO2017/005601
PCT Pub. Date: Jan. 12, 2017

(65) Prior Publication Data
US 2018/0199582 A1    Jul. 19, 2018

(30) Foreign Application Priority Data

Jul. 9, 2015 (EP) .................................. 15176049

(51) Int. Cl.
*A23C 9/127* (2006.01)
*A23C 17/02* (2006.01)
(Continued)

(52) U.S. Cl.
CPC .............. *A23C 9/127* (2013.01); *A23C 13/16* (2013.01); *A23C 17/02* (2013.01); *A23C 19/032* (2013.01);
(Continued)

(58) Field of Classification Search
CPC .............. A23C 19/032; A23Y 2240/00; A23Y 2240/75; A23Y 2240/41; A23Y 2220/00; A23Y 2220/15; A23Y 2220/29
See application file for complete search history.

(56) References Cited

U.S. PATENT DOCUMENTS 3,674,508 A   7/1972 Kasik et al.
5,077,063 A   12/1991 Nikitenko
(Continued)

FOREIGN PATENT DOCUMENTS

CN   103 300 147 A   9/2003
CN   103 190 478 A   7/2013
(Continued)

OTHER PUBLICATIONS

Røssland, et al., "Influence of Controlled Lactic Fermentation on Growth and Sporulation of *Bacillus cereus* in Milk," *International Journal of Food Microbiology*, vol. 103, No. 1, pp. 69-77 (2005).
(Continued)

*Primary Examiner* — Lien T Tran
*Assistant Examiner* — Tynesha L McClain
(74) *Attorney, Agent, or Firm* — Foley & Lardner LLP

(57) ABSTRACT

A method for producing a lactic acid bacteria fermented milk product comprising fermenting milk with both inoculated lactic acid bacteria (LAB) and inoculated *Bacillus* bacteria.

1 Claim, 5 Drawing Sheets

Figure 1:
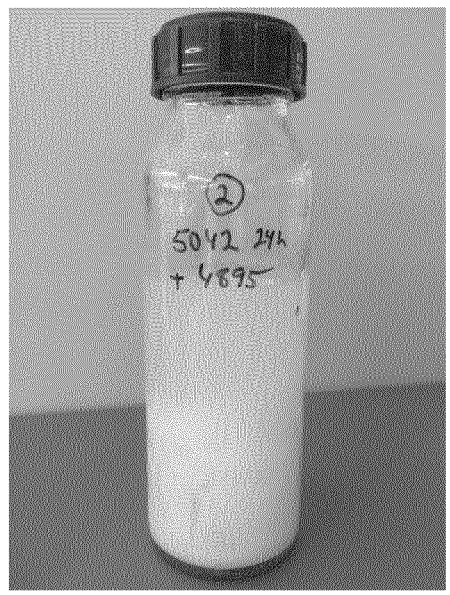
Figure 1:
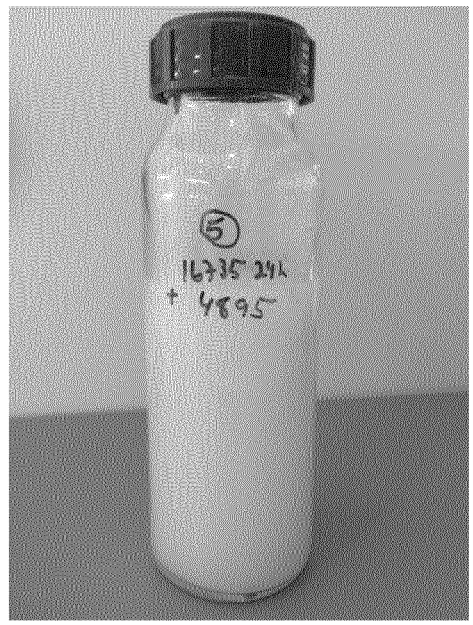

(51) Int. Cl.
*A23C 19/032* (2006.01)
*A23C 13/16* (2006.01)

(52) U.S. Cl.
CPC ....... *A23Y 2220/15* (2013.01); *A23Y 2220/29* (2013.01); *A23Y 2240/41* (2013.01); *A23Y 2240/75* (2013.01)

(56) References Cited

U.S. PATENT DOCUMENTS

2008/0193594 A1\* 8/2008 Obert ................. A23C 9/1232
426/43
2009/0011081 A1 1/2009 Lin et al.

FOREIGN PATENT DOCUMENTS

KR 2009 0039941 A 4/2009
WO WO 2009/155733 A1 12/2009

OTHER PUBLICATIONS

The European Union (EU) European Food Safety Authority (EFSA) Panel on Biological Hazards (BIOHAZ), "Scientific Opinion on the Maintenance of the List of QPS Biological Agents Intentionally Added to Food and Feed," *EFSA Journal 2013*; vol. 11, No. 11: 3449, 105 pages (Dec. 2014).

\* cited by examiner

FERMENTED MILK INOCULATED WITH BOTH LACTIC ACID BACTERIA (LAB) AND BACILLUS

CROSS-REFERENCE TO RELATED APPLICATIONS

The present application is the U.S. National Stage of International Application PCT/EP2016/065327, filed Jun. 30, 2016, and claims priority to European Patent Application No. 1517600.3.1, filed Jul. 9, 2015.

FIELD OF THE INVENTION

The present invention relates a method for producing a lactic acid bacteria fermented milk product comprising fermenting milk with both inoculated lactic acid bacteria (LAB) and inoculated Bacillus bacteria.

BACKGROUND ART

Lactic acid bacteria (LAB) are intensively used in the dairy industry for making different fermented milk products such as e.g. yogurt, cheese etc.

Lactic acid bacteria (LAB) have achieved Generally Recognized As Safe (GRAS) status.

Generally Recognized As Safe (GRAS) is an American Food and Drug Administration (FDA) designation that a chemical or substance added to food is considered safe by experts.

Lactic acid bacteria designates a gram-positive, microaerophilic or anaerobic bacteria, which ferments sugars with the production of acids including lactic acid as the predominantly produced acid, acetic acid and propionic acid. The industrially most useful lactic acid bacteria are found within the order "Lactobacillales" which includes Lactococcus spp., Streptococcus spp., Lactobacillus spp., Leuconostoc spp., Pediococcus spp., and Enterococcus spp., and the order "Actinomycetales" which includes Brevibacterium spp. and Propionibacterium spp.

Bacillus bacteria are not as such considered to be lactic acid bacteria.

The prior art describes use of Bacillus bacteria as such (i.e. without addition of LAB starter culture—such as e.g. Lactobacillus or Lactococcus) for making fermented milk products such as e.g. yogurt—an example is e.g. US2009/0011081A1 (see below).

US2009/0011081A1 describes use of Bacillus subtilis var. natto strain for producing a yogurt. The B. subtilis var. natto strain is not considered a human pathogen and is classified as GRAS. The B. subtilis var. natto strain is capable of suppressing the proliferation of certain unwanted other bacteria (e.g. unwanted E. coli) and it can generate a hygienic compound, Nattokinase, which is considered to be potential in thrombosis therapy so that the yogurt made by a B. subtilis var. natto strain may provide an efficacy in preventing from cardiovascular diseases.

U.S. Pat. No. 5,077,063 describes use of a Bacillus subtilis strain for producing a fermented milk product. It describes that antibacterial substances produced by the Bacillus bacteria strain ensure preparation of a product with a long shelf-life and possessing active therapeutic and preventive properties.

In short, prior art describes use of Bacillus bacteria as such due to e.g. positive antibacterial and therapeutic properties of the Bacillus bacteria as such.

CN103300147A describes a method for producing fermented milk by using a two-step method. In the first step milk is fermented with Bacillus subtilis in order for the proteins in the skimmed milk to be degraded into amino acids or polypeptides by the Bacillus generated proteases. In the second step the lactic acid bacteria (Lactobacillus plantarum) are added to the earlier Bacillus fermented milk and lactic acid bacteria fermentation (i.e. lowering the pH—acidification) is then performed. In the abstract is said that this two-step procedure provides advantages for the growth of Lactobacillus plantarum.

In the first step the milk is fermented with Bacillus subtilis for 48 hours (see e.g. and thereafter (step two) the Lactobacillus plantarum was added.

The article of Rossland et al. (Influence of controlled lactic fermentation on growth and sporulation of Bacillus cereus in milk. International journal of food microbiology, 103(1), pp. 69-77 (2005)) relates to an investigation of the capacity of Lactobacillus or Lactococcus of inhibiting Bacillus cereus growth and sporulation. B. cereus is considered an unwanted pathogen and easily contaminates many types of foods and it obviously therefore does not have GRAS status. In order to make the analysis, milk was inoculated with small amounts ($10^2$ Colony Forming Units (cfu)/ml) of B. cereus and Lactobacillus or Lactococcus strains and co-cultured/fermented. To only inoculate with small amounts of B. cereus is in line with the purpose of this article, which relates to an investigation of the capacity of Lactobacillus or Lactococcus of inhibiting Bacillus cereus pathogen growth and does not as such relate to producing a commercial relevant fermented milk product (e.g. a yogurt or cheese) as such. It is evident that this article does not as such relate to producing a commercial relevant fermented milk product (e.g. a yogurt or cheese) as such, since no skilled person would inoculate milk with pathogenic Bacillus cereus in order to produce e.g. a yogurt.

CN103190478A discloses a method for preparing yogurt comprising levan comprising the following steps: 1) Culturing a levansucrase-producing bacterial strain to obtain a fermented broth containing levansucrase enzyme excreted by the strain, 2) Centrifugation of the fermented broth obtained in step 1) to separate supernatant and bacterial cells, 3) adding ammonium sulfate to the supernatant to precipitate the enzyme protein and centrifuging to obtain protein precipitate and purifying the protein precipitate to obtain pure levansucrase, and 4) adding sucrose and the pure levansucrase obtained in step 3) to raw milk and inoculating with lactic acid bacteria and fermenting the mixture to obtain yogurt with levans. The levansucrase-producing bacterial strain may e.g. be Bacillus licheniformis ATCC14580 and Bacillus subtilis ATCC6051. The lactic acid bacteria may e.g. Lactobacillus bulgaricus CICC6046 and Streptococcus thermophilus CICC6038 or a mixture thereof.

KR20090039941A discloses a method for producing functional fermented material using a mixture of Rubus coreanus Miq (Bokbunja) and chlorella using a mixture of lactic acid bacteria and Bacillus.

U.S. Pat. No. 3,674,508 in the Examples discloses a method of producing a fermented milk product with a cheese flavor using a combination of S. thermophilus and B. stereo thermophilus to obtain a product with a cheesy flavor.

SUMMARY OF THE INVENTION

A problem to be solved by the present invention is to provide a method for making a lactic acid bacteria fermented milk product (e.g. a dairy food product such as a yogurt), wherein the lactic fermentation more rapidly reached the wanted lowered pH level (e.g. a pH of around 4.5).

It is known in the art that *Bacillus* bacteria are generally not growing optimally at low pH.

Accordingly, the prior art two-step method of CN103300147A (discussed above) may be seen as prima facie preferred to the skilled person, since the first step of fermenting with only *Bacillus* for around 48 hours before the second step of addition of the LAB starter culture would prima facie ensure that the *Bacillus* would have sufficient time to work properly at the milk natural pH around pH=6.

The present inventors tested such a prior art related two-step method.

As can be seen in working Example 1 herein—the tested two-step method of the prior art did not work properly for *Bacillus pumilus*.

Pre-incubation and fermentation with *Bacillus pumilus* for 24 hours (i.e. first step in a prior art two-step method) followed by fermentation with *S. thermophilus* (i.e. second step in a prior art two-step method) gave a fermented milk divided into two phases (see FIG. 1—top picture) and with an unwanted yellow color (see FIG. 1—bottom picture). Such phase separation and color development would result in significant problems during the application of a concept with *Bacillus* pre-incubation (i.e. a two-step method of the prior art).

As further discussed in Example 1 herein (see also FIG. 2 herein)—for the tested two-step method of the prior art there was no improvement of acidification activity compared to the *S. thermophilus* strains alone.

The result of Example 2 herein demonstrated essentially the same for *Bacillus subtilis* as for *Bacillus pumilus* in Example 1, since also for *Bacillus subtilis* a two-step method of the prior art did not work properly.

As discussed herein—the present inventors tested a different one-step fermentation method (i.e. only one lactic fermentation step with both with *Bacillus* and lactic acid bacteria).

Contrary to the tested two-step method of the prior—a one-step fermentation method (e.g. only one lactic fermentation step with both with *Bacillus* and lactic acid bacteria) of the present invention worked really well—i.e. a significant improvement of acidification activity was obtained (see numerous working Examples herein).

Further and as discussed in working example herein, the one-step fermentation method of the present invention gives a commercially relevant fine fermented milk product (i.e. not with e.g. unwanted phase separation and color development—see e.g. working Example 6 herein).

The table below shows the different *Bacillus* and lactic acid bacteria, which in the different working examples herein were shown to work properly in a one-step fermentation method of the present invention—i.e. where the lactic fermentation more rapidly reached the wanted lowered pH level (e.g. a PH of around 4.5):

| *Bacillus* | Lactic acid bacteria (LAB) |
|---|---|
| B. pumilus | S. thermophilus |
| Bacillus subtilis | Lactobacillus delbrueckii ssp. bulgaricus |
| B. licheniformis | Lactococcus lactis |
| B. amylioliquefaciens | |
| B. megaterium | |

Accordingly, the one-step fermentation method of the present invention has been shown to work for a number of different *Bacillus* species and for 3 different LAB from different genus.

Without being limited to theory, there is therefore no significant technical reasons to believe that it should not be a so-called class effect—i.e. that the present invention should not work for substantial all herein relevant combinations of *Bacillus* cells and LAB cells.

Further, as shown in e.g. working Example 6 herein—for a particular LAB of interest (e.g. a *Streptococcus*) it is relatively easy to set up a small-scale (e.g. 1 ml milk) screening assay to identify suitable good working *Bacillus* strains.

Accordingly, a first aspect of the invention relates to a method for producing a lactic acid bacteria fermented milk product comprising following step:

(a): fermenting milk with from $10^4$ to $10^{12}$ cfu/ml of inoculated lactic acid bacteria (LAB) and from $10^4$ to $10^{12}$ cfu/ml of inoculated *Bacillus* bacteria under suitable conditions at a temperature from 22° C. to 45° C. until the fermented milk reaches a wanted pH of 3.5 to 5.5 and wherein the start of the *Bacillus* bacteria fermentation of the milk is within the time period range of five hours before to four hours after the start of the LAB fermentation of the milk; and wherein the inoculated *Bacillus* bacteria in step (a) are at least one *Bacillus* bacterium selected from the group consisting of: *Bacillus amyloliquefaciens*, *Bacillus aryabhattai*, *Bacillus atrophaeus*, *Bacillus clausii*, *Bacillus coagulans*, *Bacillus flexus*, *Bacillus fusiformis*, *Bacillus lentus*, *Bacillus licheniformis*, *Bacillus megaterium*, *Bacillus methylotrophicus*, *Bacillus mojavensis*, *Bacillus pumilus*, *Bacillus safensis*, *Bacillus siamensis*, *Bacillus simplex*, *Bacillus sonorensis*, *Bacillus subtilis*, *Bacillus tequilensis* and *Bacillus vallismortis*.

All of the immediately above listed *Bacillus* bacteria types are considered healthy and therefore not pathogenic.

As discussed above *Bacillus cereus* is considered pathogenic and the use of such pathogenic *Bacillus* are not as such of commercial interest in the present context of making e.g. food/feed products.

For instance, the European Union (EU) European Food Safety Authority (EFSA) Panel on Biological Hazards (BIOHAZ) Scientific Opinion on the maintenance of the list of QPS biological agents intentionally added to food and feed (2013 update) reads in relation to the in the method of the first aspect listed *Bacillus* bacteria types: "Absence of toxigenic activity".

The same EFSA 2013 report reads in relation to *Bacillus cereus*: "There is increasing evidence of pathogenicity".

The citation reference of above quoted EFSA 2013 report is "EFSA Journal 2013; 11(11):3449 [108 pp.]. doi:10.2903/j.efsa.2013.3449" and at the filing date of the present application it could be downloaded via following link: http://www.efsa.europa.eu/en/efsajournal/doc/3449.pdf As discussed in e.g. working Example 7 herein—it is believed that the method of the first aspect as described would not work at a commercially acceptable level by using less than around $10^4$ cfu/ml (preferably around $10^5$ cfu/ml) of *Bacillus* bacteria in step (a) of the method of the first aspect as described herein.

As discussed above—in the article of Rossland et al. (2005) milk was inoculated with small amounts ($10^2$ cfu/ml) of *B. cereus*, which is in line of the purpose of this article, which relates to an investigation of the capacity of *Lactobacillus* or *Lactococcus* of inhibiting *Bacillus cereus* pathogen growth and not as such relating to producing a commercial relevant fermented milk product (e.g. a yogurt or cheese) as such. Accordingly, the in working Examples herein tested not pathogenic *Bacillus* bacteria did not work properly by use of the small amounts ($10^2$ cfu/ml) of *Bacillus* bacteria as disclosed in the article of Rossland et al. (2005).

As discussed above, a main purpose of step (a) of the first aspect is to have a one-step simultaneous fermentation with the presence of both the LAB and the *Bacillus* bacteria.

It is evident that this is obtained if the LAB and *Bacillus* bacteria are inoculated at the same point in time to the milk.

However, as understood by the skilled person in the art in the present context, one may inoculate the LAB and *Bacillus* bacteria to the milk at different point in times within a relative short time period range—this fact is reflected in step (a) of the first aspect, where it reads: "and wherein the start of the *Bacillus* bacteria fermentation of the milk is within the time period range of five hours before to four hours after the start of the LAB fermentation of the milk"

It is routine work for the skilled person to determine "the start of the LAB fermentation of the milk" (e.g. by measuring increasing lactic acid amounts in the milk and/or by measuring pH acidification) and it is therefore of course also routine work for the skilled person to identify a proper point in time to start the *Bacillus* bacteria fermentation of the milk (e.g. by properly choosing the point of time of inoculating the *Bacillus* bacteria) in order to fulfill the time period range criteria above.

In relation to step (a), it is in the present context understood that "start of the *Bacillus* bacteria fermentation" and "start of the LAB fermentation of the milk" cannot be before the milk are having a suitable temperature for the bacteria fermentation and it is understood that in practice would virtual all herein commercial relevant bacteria strains do not have a significant fermentation at a temperature below 22° C. and above 45° C.

Accordingly, if for instance the *Bacillus* bacteria are inoculated to the milk at day 1 and then stored at 5° C. for e.g. 24 h then there has not been a "start of the *Bacillus* bacteria fermentation" in relation to step (a) during this storage period at 5° C.—essentially due to that *Bacillus* cells are essentially inactive at 5° C. and therefore do not ferment the milk as such.

Consequently, if there on day 2 are inoculated the lactic acid bacteria to the *Bacillus* containing 5° C. stored milk and the temperature is then raised to a suitable temperature (e.g. 37° C.)—then it will be understood that the "start of the *Bacillus* bacteria fermentation" and the "start of the LAB fermentation of the milk" in this example would be at the same time (i.e. the time when the temperature of the milk reached a suitable temperature for the bacteria and significant *Bacillus*/LAB fermentation actually starts).

As discussed in working Examples herein—fermenting with the *Bacillus* cells as such (alone) did not significantly lower the pH.

Accordingly and without being limited to theory—the experimental results as disclosed herein shows that *Bacillus* in some way or the other increase/boost the pH lowering capacity of the LAB as such when co-cultured according to the one-step fermentation method of the first aspect as described herein.

As shown in working Example 1 herein—in relation to a one-step method as described herein it seems as there was no significant growth of the tested *Bacillus pumilus* strains in the fermenting step (a) of the first aspect of the invention. In fact they were essentially dying during the fermentation process (probably due to the lowering of the pH). This may be seen as an advantage, since there may then be no or very little *Bacillus* cells present in the final lactic acid bacteria fermented milk product.

As discussed in working Example 5 herein, the present inventors made experiments to check the prior art theory (see e.g. CN1033 00147A discussed above) relating to that the proteolytic system of the *Bacillus* strains is responsible for the growth promoting effect of the LAB.

Proteinase negative *Lactococcus lactis* strains were compared to normal *Lactococcus lactis* strains and if the proteolytic system of the *Bacillus* strains were the main factor then would one expect relatively higher pH lowering effect for the proteinase negative LAB as compared to the normal LAB.

However, in the experiments of Example 5, the growth of the proteinase negative *Lactococcus lactis* strains were not much enhanced as compared to the other tested normal *Lactococcus lactis* strains.

Accordingly and without being limited to theory, it seems as the proteolytic system of the *Bacillus* cells is not the only important factor responsible for the herein discussed positive synergy effect of improving/boosting growth of LAB.

In short and based on the experimental results disclosed herein—it seems as the *Bacillus* cells do something positive for the LAB cells during the simultaneous co-culturing.

Further, it is believed that the positive influences of the *Bacillus* bacteria cells are of high importance in particular at the start of the LAB lactic fermentation of the milk.

As discussed in e.g. working Example 9 herein—by e.g. using suitable selected *Bacillus* cells one may make a fermented milk product with further commercial relevant properties, such as e.g. improved texture properties and/or increased amounts of vitamin K.

The present invention further relates to a composition for producing a lactic acid bacteria fermented milk product comprising a starter culture comprising at least one lactic acid bacterium and at least one *Bacillus* bacterium selected from the group consisting of: *Bacillus amyloliquefaciens, Bacillus aryabhattai, Bacillus atrophaeus, Bacillus clausii, Bacillus coagulans, Bacillus flexus, Bacillus fusiformis, Bacillus lentus, Bacillus licheniformis, Bacillus megaterium, Bacillus methylotrophicus, Bacillus mojavensis, Bacillus pumilus, Bacillus safensis, Bacillus siamensis, Bacillus simplex, Bacillus sonorensis, Bacillus subtilis, Bacillus tequilensis* and *Bacillus vallismortis*.

The present invention further relates to the use of a *Bacillus* bacterium for producing a lactic acid bacteria fermented milk product comprising fermenting milk with from $10^4$ to $10^{12}$ cfu/ml of inoculated lactic acid bacteria (LAB) and from $10^4$ to $10^{12}$ cfu/ml of inoculated *Bacillus* bacteria under suitable conditions at a temperature from 22° C. to 45° C. until the fermented milk reaches a wanted pH of 3.5 to 5.5 and wherein the start of the *Bacillus* bacteria fermentation of the milk is within the time period range of five hours before to four hours after the start of the LAB fermentation of the milk; and wherein the *Bacillus* bacteria in is at least one *Bacillus* bacterium selected from the group consisting of: *Bacillus amyloliquefaciens, Bacillus aryabhattai, Bacillus atrophaeus, Bacillus clausii, Bacillus coagulans, Bacillus flexus, Bacillus fusiformis, Bacillus lentus, Bacillus licheniformis, Bacillus megaterium, Bacillus methylotrophicus, Bacillus mojavensis, Bacillus pumilus, Bacillus safensis, Bacillus* siamensis, *Bacillus* simplex, *Bacillus* sonorensis, *Bacillus subtilis, Bacillus tequilensis* and *Bacillus vallismortis*.

Definitions

All definitions of herein relevant terms are in accordance of what would be understood by the skilled person in relation to the herein relevant technical context.

The term "bacteria" in the present context is in plural since it makes no sense to here talk about e.g. a herein relevant lactic acid bacteria fermented milk product comprising only one single bacterium.

By "fermentation" is meant a biochemical reaction which involves releasing energy from an organic substrate by the action of microorganisms.

The term "fermented milk product" refers to products which are intended for animal, more specifically human, consumption and which are derived fermentation by a bacterium of a milk substrate. Such products may contain secondary ingredients, such as fruits, vegetables, sugars, flavors, etc.

As used herein, the term "lactic acid bacterium" designates a gram-positive, microaerophilic or anaerobic bacterium, which ferments sugars with the production of acids including lactic acid as the predominantly produced acid, acetic acid and propionic acid. The industrially most useful lactic acid bacteria are found within the order "Lactobacillales" which includes *Lactococcus* spp., *Streptococcus* spp., *Lactobacillus* spp., *Leuconostoc* spp., *Pediococcus* spp., and *Enterococcus* spp., and the order "Actinomycetales" which includes *Brevibacterium* spp. and *Propionibacterium* spp. Additionally, lactic acid producing bacteria belonging to the group of the strict anaerobic bacteria, bifidobacteria, i.e. *Bifidobacterium* spp., are generally included in the group of lactic acid bacteria. These are frequently used as food cultures alone or in combination with other lactic acid bacteria.

The term "lactic fermentation" denotes an anaerobic or microaerobic process of the consumption of among other lactose by the bacteria in the ferments, which causes the formation of lactic acid, and potentially acetic acid, and a lowering of the pH.

The term "lactic acid bacterium fermented milk product" refers to products which are intended for animal, more specifically human, consumption and which are derived from acidifying lactic fermentation by a lactic acid bacterium of a milk substrate.

Such products may contain secondary ingredients, such as fruits, vegetables, sugars, flavors, etc.

In the present context, the term "milk" comprises milk of a mammal or a plant. Examples of milk are cow's milk (bovine milk), camel milk, buffalo milk, goat's milk, sheep's milk, and soy milk. Optionally the milk is acidified, e.g. by addition of an acid (such as citric, acetic, or lactic acid), or mixed, e.g. with water. The milk may be raw or processed, e.g. by filtering, sterilizing, pasteurizing, homogenizing etc., or it may be reconstituted dried milk. An important example of "bovine milk" according to the present invention is pasteurized cow's milk. It is understood that the milk may be acidified, mixed, or processed before, during, and/or after the inoculation with bacteria.

In the present context, a fermented milk "starter culture" is a bacterial culture which comprises at least one strain of lactic acid bacteria selected from the group consisting of *Lactococcus lactis, Lactobacillus delbrueckii* subsp. *bulgaricus* and *Streptococcus thermophilus*. In accordance herewith, a fermented milk product is obtainable by inoculating milk and fermenting the milk with the strains added. Typically, a starter culture for yogurt comprises *Streptococcus thermophilus* and *Lactobacillus delbrueckii* subsp. *bulgaricus*, and in most countries a yogurt is by legislation defined as a fermented milk product produced using a starter culture comprising the two said strains.

Embodiments of the present invention are described below, by way of examples only.

DRAWINGS

FIG. 1: The milk obtained with the pre-incubated *Bacillus pumilus* strain CHCC5042 has divided into two phases (see FIG. 1—top picture). The milk with the pre-incubated *Bacillus pumilus* strain CHCC16735 was still yellow (see FIG. 1—bottom picture). See working Example 1 herein for further details.

Figure 2:
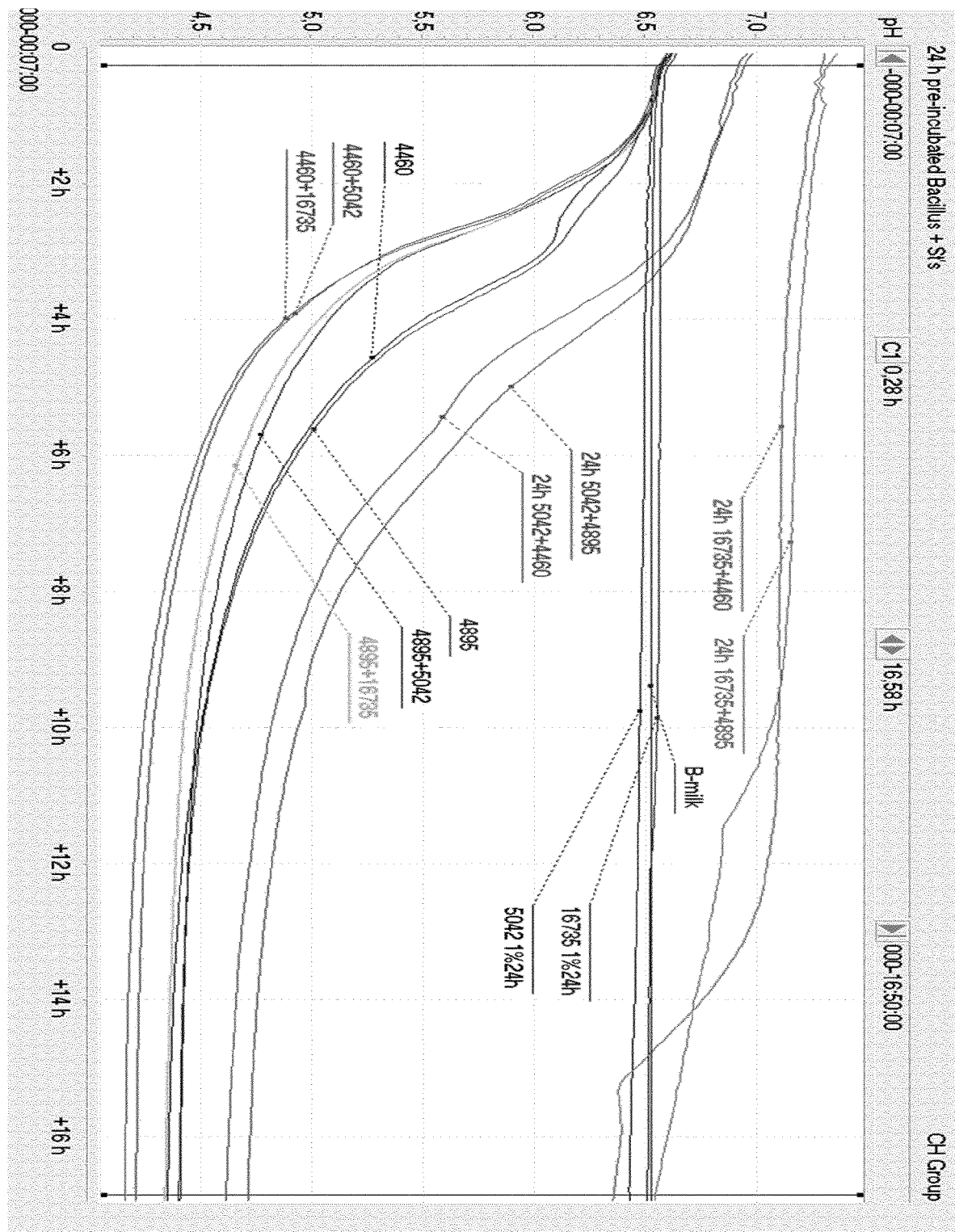

FIG. 2: Results from acidification experiment with *B. pumilus* and *S. thermophilus*. See working Example 1 herein for further details.

Figure 3:
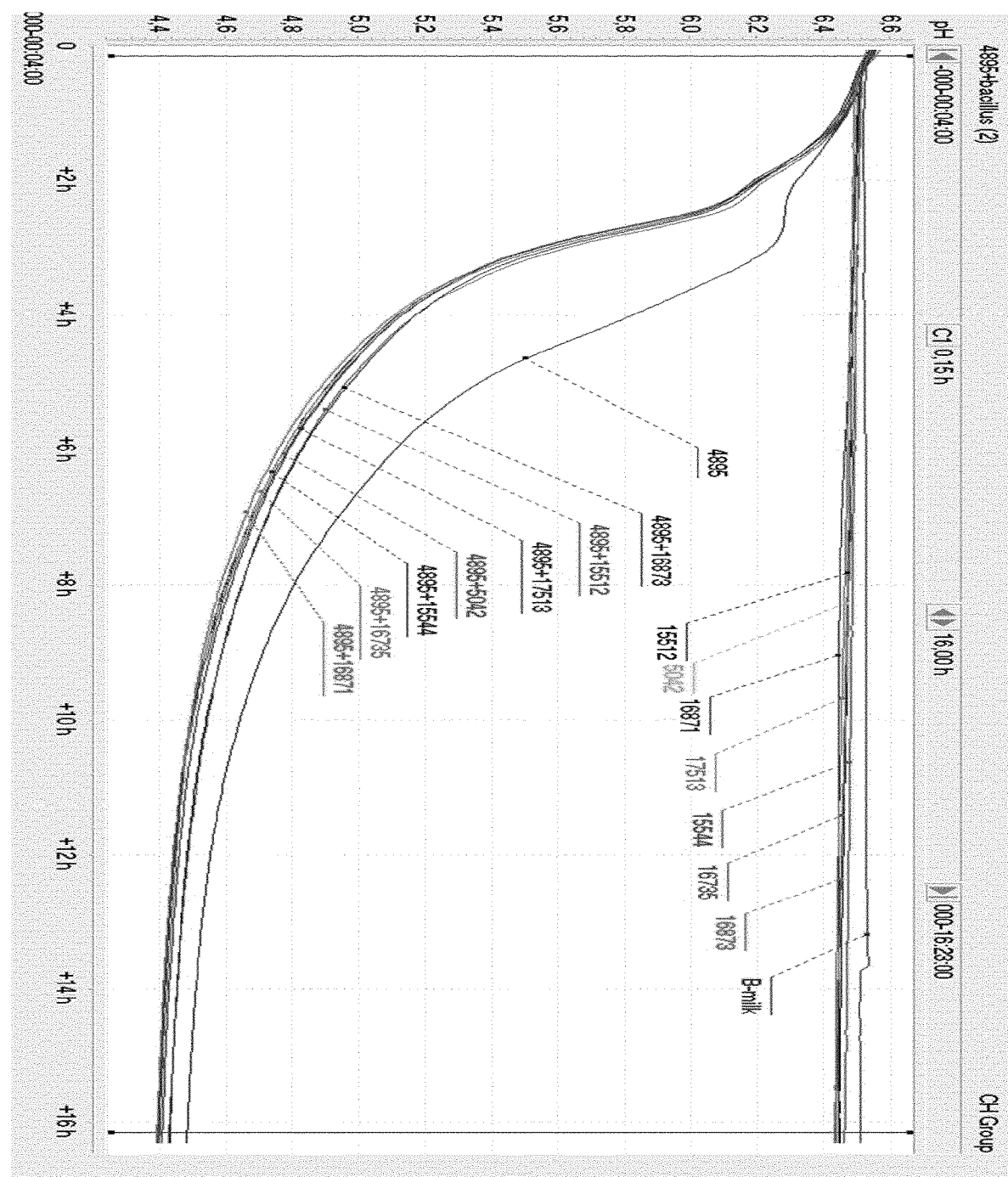

FIG. 3: Results from acidification experiment with *B. subtilis, B. pumilus* and *S. thermophilus*. See working Example 3 herein for further details.

Figure 4:
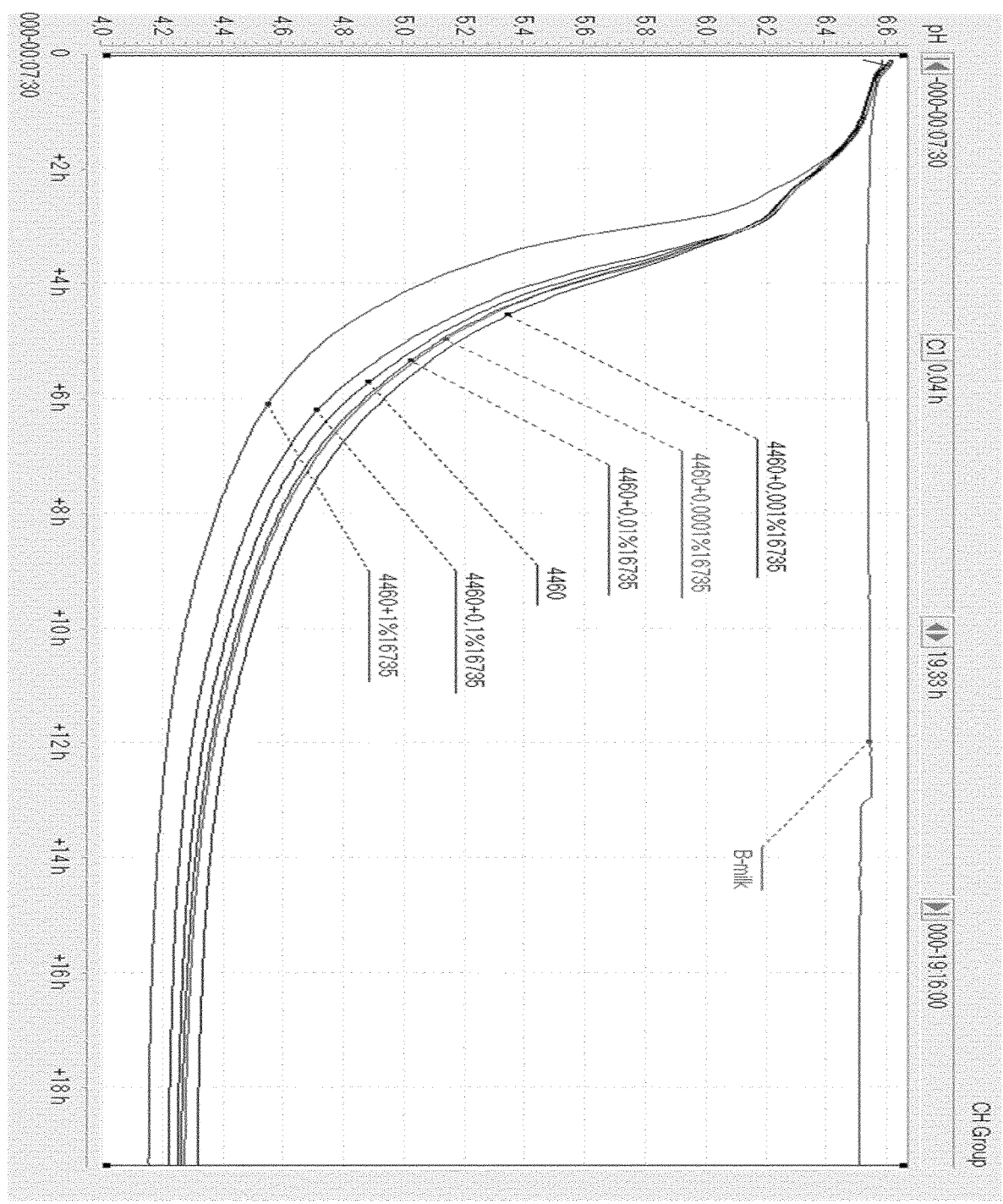

FIG. 4: Results from experiments relating to growth stimulation of *S. thermophilus* CHCC4460 with different concentrations of *Bacillus pumilus* CHCC16735. See working Example 7 herein for further details.

Figure 5:
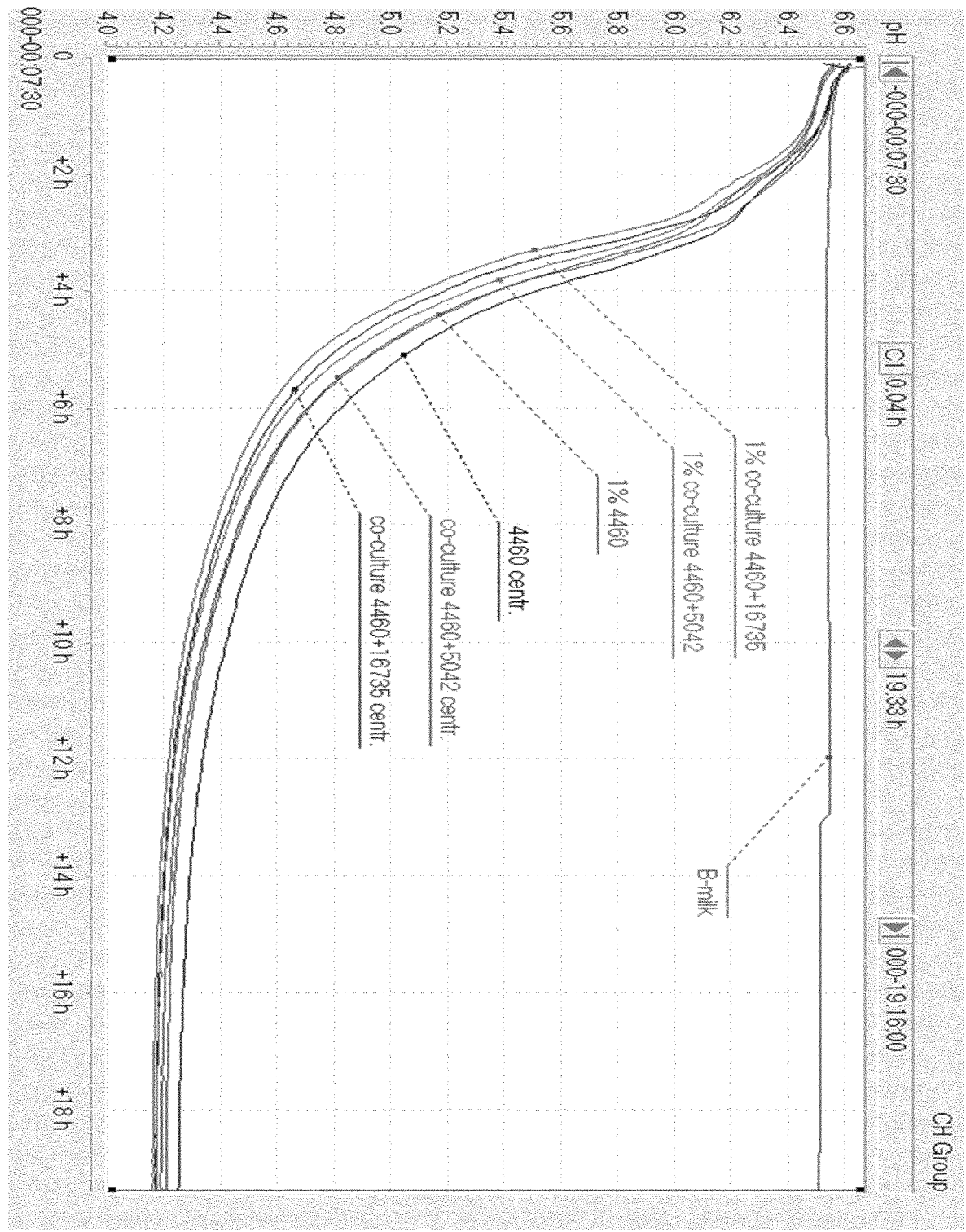

FIG. 5: Results from experiments relating to pre Co-culturing of ST and *Bacillus*. See working Example 8 herein for further details.

DETAILED DESCRIPTION OF THE INVENTION

As understood by the skilled person, a combination of herein relevant preferred embodiments will be understood as even more preferred—for instance use of preferred lactic acid bacteria (LAB) together with preferred *Bacillus* bacteria is to be understood as even more preferred.

Fermenting Milk with Both LAB and *Bacillus* Bacteria—Step (a) of First Aspect

As discussed above—step (a) of first aspect relates to fermenting milk with from $10^4$ to $10^{12}$ cfu/ml of inoculated lactic acid bacteria (LAB) and from $10^4$ to $10^{12}$ cfu/ml of inoculated *Bacillus* bacteria under suitable conditions at a temperature from 22° C. to 45° C. until the fermented milk reaches a wanted pH of 3.5 to 5.5 and wherein the start of the *Bacillus* bacteria fermentation of the milk is within the time period range of five hours before to four hours after the start of the LAB fermentation of the milk.

As understood by the skilled person in the present context—the term "inoculated" in step (a) relates to the lactic acid bacteria and *Bacillus* bacteria are actively added to the milk.

In step (a) may be added a mixture of different types of *Bacillus* bacteria—but the different types shall be a type within the list of the first aspect or preferred embodiments thereof.

For instance, in step (a) may be inoculated e.g. $10^5$ cfu/ml of *Bacillus pumilus* and $10^5$ cfu/ml of *Bacillus subtilis*, which in sum gives addition/inoculation in step (a) of $2\times10^5$ cfu/ml of *Bacillus* bacteria.

In a preferred embodiment of the invention, the inoculated *Bacillus* bacterium in step (a) is at least one *Bacillus* bacterium selected from the group consisting of *Bacillus amyloliquefaciens, Bacillus atrophaeus, Bacillus clausii, Bacillus coagulans, Bacillus fusiformis, Bacillus lentus*,

*Bacillus* licheniformis, *Bacillus* megaterium, *Bacillus mojavensis, Bacillus pumilus, Bacillus subtilis* and *Bacillus vallismortis*.

Preferably, the inoculated *Bacillus* bacteria in step (a) are at least one *Bacillus* bacterium selected from the group consisting of: *Bacillus* amyloliquefaciens, *Bacillus* licheniformis, *Bacillus* megaterium, *Bacillus pumilus* and *Bacillus subtilis*.

Preferably, the inoculated *Bacillus* bacteria in step (a) are at least one *Bacillus* bacterium selected from the group consisting of: *Bacillus pumilus* and *Bacillus subtilis*. A preferred *Bacillus subtilis* may be *B. subtilis* var. *natto*.

Preferably, the inoculated lactic acid bacteria in step (a) are at least one lactic acid bacterium selected from the group consisting of: *Lactococcus* spp., *Streptococcus* spp., *Lactobacillus* spp., *Leuconostoc* spp., *Pediococcus* spp., and *Enterococcus* spp., *Brevibacterium* spp. and *Propionibacterium* spp.

Similar to *Bacillus* bacteria, in step (a) may be added a mixture of different types of lactic acid bacteria—e.g. a mixture of *Streptococcus* spp and *Lactobacillus* spp.

More preferably, the inoculated lactic acid bacteria in step (a) are at least one lactic acid bacterium selected from the group consisting of: *Lactococcus* spp., *Streptococcus* spp., and *Lactobacillus* spp.

It may be even more preferred that lactic acid bacteria are selected from the group consisting of: *Lactococcus* spp., *Streptococcus* spp., and *Lactobacillus* spp. and *Bacillus* bacteria are selected from the group consisting of: *Bacillus pumilus* and *Bacillus subtilis*.

Even more preferably, the inoculated lactic acid bacteria in step (a) are lactic acid bacteria selected from the group consisting of: *S. thermophilus, Lactobacillus delbrueckii* ssp. *bulgaricus* and *Lactococcus lactis*.

In working examples herein was identified a particular good positive effect for *S. thermophilus*.

Accordingly, it may be preferred that the inoculated lactic acid bacteria in step (a) are *S. thermophilus*.

It may be particular preferred that the inoculated lactic acid bacteria in step (a) are *S. thermophilus* and the inoculated *Bacillus* bacteria in step (a) of first aspect are at least one *Bacillus* bacterium selected from the group consisting of: *Bacillus pumilus* and *Bacillus subtilis*.

Preferably, there is in step (a) used from $10^5$ to $10^{11}$ cfu/ml of inoculated lactic acid bacteria (LAB), more preferably there is in step (a) used from $10^6$ to $10^{10}$ cfu/ml of inoculated lactic acid bacteria (LAB).

Preferably, there is in step (a) used from $2\times10^4$ to $10^{10}$ cfu/ml of inoculated *Bacillus* bacteria, more preferably there is in step (a) used from $10^5$ to $10^9$ cfu/ml of inoculated *Bacillus* bacteria and even more preferably there is in step (a) used from $10^6$ to $10^8$ cfu/ml of inoculated *Bacillus* bacteria.

It is routine work for the skilled person to identify suitable fermentation conditions to get a wanted pH value—it will generally depend on the specifically used LAB and *Bacillus* bacteria.

Suitable conditions may comprise:

(i): a temperature from 22° C. to 45° C. (preferably from 32° C. to 42° such as from 36° C. to 38°;

(ii): fermenting time period of from 2 hours to 100 hours, such as from 3 hours to 48 hours or such as from 10 hours to 30 hours.

Generally speaking and as known to the skilled person—the preferred/optimal fermentation temperature will depend on the LAB used. For instance, some LAB have optimal growth at around 25° C. and other LAB have optimal growth around 37° C.

Depending on the fermented milk product of interest—the wanted pH may be a pH of 4 to 5, such as a pH of 4.4 to 4.6.

Preferably, the start of the *Bacillus* bacteria fermentation of the milk is within the time period range of 3 hours before to two hours after the start of the LAB fermentation of the milk—such as e.g. that the start of the *Bacillus* bacteria fermentation of the milk is within the time period range of 2 hours before to one hour after the start of the LAB fermentation of the milk.

More preferably, the start of the *Bacillus* bacteria fermentation of the milk is within the time period range of 1 hour before to 30 minutes after the start of the LAB fermentation of the milk.

Even more preferably, the start of the *Bacillus* bacteria fermentation of the milk is within the time period range of 30 minutes before to 15 minutes after the start of the LAB fermentation of the milk.

Most preferably, the start of the *Bacillus* bacteria fermentation of the milk is within the time period range of 5 minutes before to 5 minutes after the start of the LAB fermentation of the milk.

As understood by the skilled person in the present context—if *Bacillus* bacteria in step (a) is inoculated to the milk under suitable conditions for fermenting the milk (e.g. a temperature of 37° C. etc.) then will the start of the *Bacillus* bacteria fermentation of the milk in practice be at the same time as the inoculation to the milk.

The same goes for lactic acid bacteria—i.e. if LAB in step (a) is inoculated to the milk under suitable conditions for fermenting the milk (e.g. a temperature of 37° C. etc.) then will the start of the start of the LAB fermentation of the milk in practice be at the same time as the inoculation to the milk.

As discussed above, a main purpose of step (a) of the first aspect is to have a one-step simultaneous fermentation with the presence of both the LAB and the *Bacillus* bacteria.

It is evident that this is obtained if the LAB and *Bacillus* bacteria are inoculated at around the same point in time to the milk.

Accordingly, a preferred embodiment of the method of the first aspect and herein described embodiments thereof is, wherein in step (a) the lactic acid bacteria and *Bacillus* bacteria are inoculated to the milk within a time period range of less than five hours (preferably less than two hours, more preferably less than one hour, even more preferably less than 20 minutes and most preferably less than 5 minutes). As understood by the skilled person in relation to the paragraph immediately above—if for instance the *Bacillus* bacteria are first inoculated to the milk then shall the lactic acid bacteria be inoculated to the milk within the required preferred time range (e.g. 5 minutes thereafter).

The same of course applies if the lactic acid bacteria are first inoculated to the milk then shall the *Bacillus* bacteria be inoculated to the milk within the required preferred time range.

A preferred embodiment of the method of the first aspect and herein described embodiments thereof is, wherein the fermented milk in step (a) reaches pH=4.5 faster than in a comparative method performed under identical conditions as in the method of the first aspect, except that there in the comparative method is not made any inoculation of the milk with *Bacillus* bacteria in step (a).

It is routine work for the skilled person to perform such a true comparative analysis—it was e.g. routinely done in working Example 1 herein. In a particular embodiment of the invention, the comparative method is carried out as follows:

The *Bacillus* strain was inoculated in MRS broth and incubated at 37° C. overnight. The overnight culture were centrifuged, and the pellet were resuspended 1 Vol. B-milk (9.5% skim milk, boiled for 30 min at 99° C.). A *S. thermophilus* strain was pre-grown in M17 with 2% lactose at 37° C., centrifuged, and resuspended in 1 Vol. B-milk.

For the acidification experiment the resuspended *Bacillus* and *S. thermophilus* strains were inoculated 1% each in 200 ml B-milk (9.5% skim milk, boiled for 30 min at 99° C.). Acidification was followed at 37° C. in a water bath by measuring the pH with a PC logger overnight.

As understood by the skilled person, the comparative method shall be identical (except not made any inoculation of the milk with *Bacillus* bacteria)—i.e. everything else (e.g. amount of milk (e.g. 200 ml or 100 L) fermented in step (a); temperature etc) shall be identical to the method of the first aspect (i.e. with inoculation of the LAB in step (a)).

In a preferred embodiment, the fermented milk in step (a) reaches pH=4.5 30 minutes (more preferably 1 hour and even more preferably 2 hours) faster than in a comparative method performed under identical conditions as in the method of the first aspect, except that there in the comparative method is not made any inoculation of the milk with *Bacillus* bacteria in step (a).

In a particular embodiment of the invention, the fermented milk obtained in step (a) has an increased texture as compared to fermented milk obtained in a step (a) carried out in identical conditions except that no *Bacillus* bacteria was inoculated as measured by a texture comparative method. The said texture comparative method may be a method of measuring shear stress carried out as follows:

The day after incubation, the fermented milk was brought to 13° C. and stirred gently by means of a stick fitted with a perforated disc until homogeneity of the sample. The rheological properties of the sample were assessed on a rheometer (Anton Paar Physica Rheometer with ASC, Automatic Sample Changer, Anton Paar® GmbH, Austria). Settings were as follows:

Wait time (to rebuild to somewhat original structure)
5 minutes without oscillation or rotation
Oscillation (to measure G' and G" for calculation of G*) y=0.3%, frequency (f)=[0.5 . . . 8] Hz
6 measuring points over 60 s (one every 10 s)
Rotation (to measure shear stress at 300 1/s)
ý=[0.3-300] 1/s and ý=[275-0.3] 1/s
21 measuring point over 210 s (on every 10 s) going up to 300 1/s.
and
21 measuring points over 210 s (one every 10 s) going down to 0.3 1/s
For further analysis the shear stress at 300 1/s was chosen.

Preferably, the milk in step (a) of the first aspect is cow milk, camel milk, buffalo milk, goat's milk or sheep's milk—more preferably, the milk in step (a) of the first aspect is cow milk.

It may be preferred that the method of the first aspect as described herein is a commercial relevant relatively large scale production method.

Accordingly, it may be preferred that the amount of milk in step (a) of the first aspect is an amount of milk of at least 100 L, more preferably an amount of milk of at least 1000 L and even more preferably an amount of milk of at least 10000 L.

It may be preferred to make a starter culture composition comprising both the herein required amounts of lactic acid bacteria (LAB) and *Bacillus* bacteria and then to use this starter culture composition for inoculation of the milk in step (a) of the first aspect.

Accordingly, in a preferred embodiment is the inoculation of the milk in step (a) of the first aspect done by use of a single starter culture composition comprising both the lactic acid bacteria (LAB) and the *Bacillus* bacteria in the required amounts.

It may be preferred that the single starter culture composition has been obtained by prior co-culturing of the LAB and the *Bacillus* bacteria.

Further Steps of Method for Producing Fermented Milk Product

The skilled person knows how to make a lactic acid bacteria fermented milk product (e.g. yogurt or a cheese product)—accordingly, there is no need to describe further steps after step (a), i.e. the fermentation step, in great details in the present context.

Further steps may include a step of simply packaging the fermented milk product in a suitable package. A suitable package may thus be a bottle, a carton, or similar, and a suitable amount may be e.g. 10 mL to 5000 mL or 50 mL to 1000 mL.

When the fermented milk product is a cheese—further steps may include steps of cutting the coagulum into cheese curd particles in order to separate the whey from the cheese curd.

Depending of the type of fermented milk product of interest—further steps may include e.g. addition of other relevant bacteria or e.g. use of relevant milk-clotting enzymes, such as chymosin and pepsin.

Preferably, the lactic acid bacteria fermented milk product is a dairy food product.

Preferably, the lactic acid bacteria fermented milk product is fermented milk product selected from the group consisting of: kefir, yogurt, cheese, sour cream, Crème fraiche, Kumis, Cultured buttermilk and *Acidophilus* milk.

Preferably, the lactic acid bacteria fermented milk product is selected from the group consisting of: yogurt and cheese. In a particular embodiment the lactic acid bacteria fermented milk product is yogurt. In a particular embodiment the lactic acid bacteria fermented milk product is cheese.

EXAMPLES

If not said otherwise, the milk used in the examples below was so-called B-milk (9.5% reconstituted skim milk, heat treated 30 min at 99° C.). B-milk is cow milk.

Example 1: Comparative Experiments—Two-Step Method of the Prior Art Compared with One-Step Fermentation Method of the Invention—*B. pumilus* and *S. thermophilus*

As discussed above (the prior art—e.g. CN103300147A) describes a method for producing fermented milk by using a two-step method. In first step milk is fermented with *Bacillus subtilis* (48 hours in CN103300147A) and in the second step the lactic acid bacteria are added to the earlier *Bacillus* fermented milk and lactic acid bacteria fermentation (i.e. lowering the pH—acidification) is then performed.

As discussed in this working Example 1—the present inventors compared two-step method of the prior art with one-step simultaneous method of the invention.

*Bacillus pumilus* Alone:

*Bacillus pumilus* CHCC5042 and CHCC16735 were inoculated from frozen ampoules in 3×5 ml BHI broth each and incubated at 37° C. with 150 rpm ON (OverNight).

4×200 ml B-milk was transferred to 4 shake bottles and the *B. pumilus* strains 5042 and 16735 were inoculated 1% (from ON culture in Brain-heart infusion medium (BHI) medium) in 2 bottles each. They were incubated at 37° C. with 150 rpm for 24 hours.

5042 and 16735 were also inoculated from frozen ampoules in 5 ml BHI broth and incubated the same way.

The 24-hours bottles with 16735 turned yellow. There was some foam formation in both bottles (i.e. for both 5042 and 16735).

Acidification Experiment with *B. pumilus* and *S. thermophilus*:

The 24-hours *B. pumilus* cultures were transferred from the shake bottles to sterile 200 ml bottles.

The *B. pumilus* ON cultures in BHI were centrifuged and the pellets were re-suspended in 5 ml B-milk each.

*S. thermophiles* (ST) CHCC4895 and CHCC4460 were inoculated in M17+2% lactose and incubated at 37° C. ON.

11 ml of the ST ON cultures are centrifuged and resuspended in each 11 ml B-milk.

1. 1% inoculation in B-milk of 5042 from 24 hours in shake bottle
2. 24 hour 5042 culture from shake bottle+1% 4895
3. 24 hour 5042 culture from shake bottle+1% 4460
4. 1% inoculation in B-milk of 16735 from 24 hours in shake bottle
5. 24 hour 16735 culture from shake bottle+1% 4895
6. 24 hour 16735 culture from shake bottle+1% 4460
7. 1% 4895
8. 1% 4895+1% 5042 (ON in BHI)
9. 1% 4895+1% 16735 (ON in BHI)
10. 1% 4460
11. 1% 4460+1% 5042 (ON in BHI)
12. 1% 4460+1% 16735 (ON in BHI)
13. B-milk Acidification at 37° C. in water-bath. pH was measured by the PC logger ON.

Results from Acidification Experiment with *B. pumilus* and *S. thermophilus*:

The cultures with the pre-incubated *Bacillus pumilus* strain CHCC5042 has divided into two phases (see FIG. 1—top picture, which relates to experiment #2 (see above)).

The culture with the pre-incubated *Bacillus pumilus* strain CHCC16735 was still yellow (see FIG. 1—bottom picture, which relates to experiment #5 (see above)).

The phase separation and color development would result in significant problems during the application of a concept with *Bacillus* pre-incubation.

As can be seen in FIG. 2 herein:

The bottles with pre-incubated *Bacillus pumilus* strains started at a higher pH.

There was no improvement of acidification activity compared to the ST strains alone.

The final pH was also significant much higher as for the STs alone.

The table 1 below shows some of the pH values of FIG. 2 at some of the time points+the time when pH=5 were reached (approximate numbers as read directly from FIG. 2):

| #   | 0 h pH | 2 h pH | 4 h pH | 6 h pH | 10 h pH | 16 h pH | Time (h) pH = 5 | Time (h) pH = 4.5 |
|-----|--------|--------|--------|--------|---------|---------|-----------------|-------------------|
| 1.  | 6.6    | 6.6    | 6.5    | 6.5    | 6.5     | 6.4     | Not             | Not               |
| 2.  | 6.9    | 6.7    | 6.3    | 5.6    | 4.9     | 4.7     | 9 h 10 min      | Not               |
| 3.  | 6.9    | 6.7    | 6.2    | 5.4    | 4.8     | 4.6     | 8 h 10 min      | Not               |
| 4.  | 6.6    | 6.6    | 6.6    | 6.6    | 6.6     | 6.6     | Not             | Not               |
| 5.  | 7.4    | 7.3    | 7.2    | 7.2    | 7.1     | 6.6     | Not             | Not               |
| 6.  | 7.4    | 7.3    | 7.2    | 7.2    | 7.1     | 6.4     | Not             | Not               |
| 7.  | 6.6    | 6.3    | 5.6    | 4.9    | 4.5     | 4.4     | 5 h 40 min      | 10 h              |
| 8.  | 6.6    | 6.2    | 5.1    | 4.7    | 4.5     | 4.4     | 4 h 20 min      | 9 h               |
| 9.  | 6.6    | 6.2    | 5.1    | 4.6    | 4.4     | 4.4     | 4 h 15 min      | 8 h               |
| 10. | 6.6    | 6.1    | 5.6    | 4.9    | 4.5     | 4.3     | 5 h 40 min      | 10 h              |
| 11. | 6.6    | 6.2    | 4.9    | 4.5    | 4.3     | 4.2     | 3 h 45 min      | 6 h               |
| 12. | 6.6    | 6.2    | 4.9    | 4.5    | 4.3     | 4.2     | 3 h 45 min      | 6 h               |
| 13. | 6.6    | 6.6    | 6.6    | 6.6    | 6.6     | 6.6     | Not             | Not               |

As discussed above:

Experiment number 7 is ST 4895 alone (i.e. control);
Experiment number 8 is ST 4895+*Bacillus* 1% 5042
Experiment number 9 is ST 4895+*Bacillus* 1% 16735

These experiments 8 and 9 were performed according to a one-step co-culturing fermentation method of the invention and the results were that the lactic fermentation significantly more rapidly reached the wanted lowered pH level—for instance pH=5 and pH=4.5 were reached significantly faster.

Similar positive results were obtained for the ST 4460 strain (compare #11 and #12 with control #10).

Fermenting with the *Bacillus* cells as such (alone) did not significantly lower the pH (see #1 and #4).

Growth Analysis of *B. pumilus* During Fermentation:

Plating of Culture 8 and 9 on BHI:

Here it was analyzed whether the effect of *Bacillus pumilus* together with the ST's is due to growth of the *Bacillus* in milk or due to something else. Culture 8 and 9 were therefore plated after inoculation, before incubation on BHI agar in dilutions from $10^{-1}$ to $10^{-4}$ and was plated again the day after to see if they have grown.

ST 4895 was streaked on BHI agar at the same time to see if it can grow on the plate. The plates were incubated aerobically at 37°.

After fermentation culture 8 and 9 were diluted 10-fold and plated again on BHI agar in dilutions from $10^{-3}$-$10^{-6}$. The plates were incubated aerobically at 37° ON. Result of the plating of CHCC4895 on BHI: the strain does not grow on the plate.

Result of the plating of culture 8 and 9 on BHI agar:

|       | Time 0   | Time 18 h |
|-------|----------|-----------|
| 5042  | 7.4E+06  | 1.0E+04   |
| 16735 | 1.0E+07  | 2.0E+04   |

CHCC4895 was not counted—it is only growing very weakly on the plate.

Most of the *Bacillus* cells seem to have been eliminated during the acidification with the ST—maybe due to the low pH.

In summary, there was no significant growth of the *Bacillus pumilus* strains. In fact they were essentially dying during the fermentation process (probably due to the lowering of the pH).

This may be seen as an advantage, since there is then no or very little *Bacillus* cells present in the final lactic acid bacteria fermented milk product.

CONCLUSIONS

The result of this Example 1 demonstrated that a two-step method of the prior art does not work properly for *Bacillus pumilus*.

Pre-incubation and fermentation with *Bacillus pumilus* for 24 hours (i.e. first step in a prior art two-step method) followed by fermentation with *S. thermophilus* (i.e. second step in a prior art two-step method) gave a fermented milk divided into two phases (see FIG. 1—top picture) and with an unwanted yellow color (see FIG. 1—bottom picture).

Such phase separation and color development would result in significant problems during the application of a concept with *Bacillus* pre-incubation (i.e. a two-step method of the prior art).

As can be seen in FIG. 2 herein and in relation to a two-step method of the prior art:
  The bottles with pre-incubated *Bacillus pumilus* strains started at a higher pH.
  There was no improvement of acidification activity compared to the ST strains alone.
  The final pH was also significant much higher as for the STs alone.

To the contrary—a one-step method (i.e. only one fermentation step with both *Bacillus pumilus* and *S. thermophilus*) of the present invention worked really well.

As can be seen in FIG. 2 herein—when the one-step method of the present invention was used one positive result was that the lactic acid fermentation significantly more rapidly reached the wanted lowered pH level.

Further, the fermented milk (step (a) in method of first aspect herein) reached the wanted pH significantly faster than in the comparative method performed under identical conditions, except that there in the comparative method was not made any inoculation to the milk with *Bacillus* bacteria (step (a) in method of first aspect herein).

In FIG. 2, this can be seen by e.g. comparing acidification of ST strain 4460 alone, which is significantly less fast/rapid than one-step simultaneous acidification profile for ST 4460+*Bacillus* 5042 and ST 4460+*Bacillus* 16735. Similar positive results were obtained for ST strain 4895, where the wanted lowered pH level were reached significantly faster with simultaneous one-step fermentation together with *Bacillus*.

Further, the result of this Example 1 demonstrated that there was no significant growth of the *Bacillus pumilus* strains during the simultaneous fermentation with ST strains. In fact *Bacillus* cells were essentially dying during the fermentation process (probably due to the lowering of the pH).

This may be seen as an advantage, since there are then no or very little *Bacillus* cells present in the final lactic acid bacteria fermented milk product.

Example 2: Comparative Experiments—Two-Step Method of the Prior Art—*B. Subtilis* and *S. thermophilus*

This example may be seen as similar to Example 1 above—in this example similar experiment was made with *Bacillus subtilis* strains CHCC15877 and CHCC16871 (in Example 1 was used *Bacillus pumilus*).

*Bacillus subtilis* strains CHCC15877 and CHCC16871 were streaked on BHI agar from frozen ampoules and incubated aerobically at 37° C. ON.

A single colony from CHCC15877 and CHCC16871 was inoculated in 6 ml BHI broth and incubated at 37° C., 150 rpm.

4×200 ml B-milk was transferred to 4 shake bottles and the *B. subtilis* strains 15877sc and 16687sc were inoculated 1% (from ON culture in BHI) in 2 bottles each.

They were incubated at 37° C. and 150 rpm for 24 hours.

*S. thermophilus* CHCC4895 and CHCC4460 were inoculated in M17+2% lactose and incubated at 37° C. ON.

Acidification Experiment:

The 24-hours *B. subtilis* cultures were transferred from the shake bottles to sterile 200 ml bottles. The strains had also this time turned the milk yellow (i.e. like in Example 1 for *Bacillus pumilus*).

7 ml of the St ON cultures were centrifuged and resuspended in each 7 ml B-milk.

1. 1% inoculation in B-milk of 15877 from 24 hours in shake bottle
2. 24 hour 15877 culture from shake bottle+1% 4895
3. 24 hour 15877 culture from shake bottle+1% 4460
4. 1% inoculation in B-milk of 16687 from 24 hours in shake bottle
5. 24 hour 16687 culture from shake bottle+1% 4895
6. 24 hour 16687 culture from shake bottle+1% 4460
7. 1% 4895
8. 1% 4460
9. B-milk Results:

All of the four pre-incubated bottles with *Bacillus subtilis* were looking like bottle 5 from the previous experiment in Example 1 (thin and yellow culture).

The bottles with pre-incubated *Bacillus subtilis* strains started at a higher pH.

There was no improvement of acidification activity compared to the ST strains alone.

The final pH was also much higher as for the Sts alone.

CONCLUSIONS

The result of this Example 2 demonstrated essentially the same for *Bacillus subtilis* as for *Bacillus pumilus* in Example 1, since also for *Bacillus subtilis* a two-step method of the prior art did not work properly.

Example 3: Growth Stimulation of *S. thermophilus* by Co-Fermentation with Strains from *Bacillus subtilis* and *B. pumilus*—One-Step Fermentation Method of the Invention Growth Stimulation of *S. thermophilus* CHCC4895 by the Addition of Strains from *Bacillus Subtilis*

The following strains from *Bacillus subtilis* were inoculated in MRS broth and incubated at 37° C. overnight:
  CHCC3810
  CHCC15877
  CHCC16282
  CHCC19200

The overnight cultures were centrifuged, and the pellets were resuspended each in 1
  Vol. B-milk (9.5% skim milk, boiled for 30 min at 99° C.).
*S. thermophilus* CHCC4895 was pre-grown in M17 with 2% lactose at 37° C., centrifuged, and resuspended in 1 Vol. B-milk.

For the acidification experiment the resuspended strains were inoculated 1% each in 200 ml B-milk. Acidification was followed at 37° C. in a water bath by measuring the pH with the PC logger overnight.
1. 1% CHCC4895
2. 1% CHCC4895+1% CHCC15877
3. 1% CHCC4895+1% CHCC16282
4. 1% CHCC4895+1% CHCC19200
5. 1% CHCC4895+1% CHCC3810
6. 1% CHCC15877
7. 1% CHCC16282
8. 1% CHCC19200
9. 1% CHCC3810
10. B-milk Results:
The *B. subtilis* strains CHCC3810, CHCC15877, CHCC16282, and CHCC19200, were able to enhance the acidification activity of ST CHCC4895.

Growth Stimulation of *S. thermophilus* CHCC4895 by the Addition of Strains from *Bacillus pumilus* and *Bacillus Subtilis*

The following strains from *Bacillus pumilus* and *B. subtilis* were inoculated in BHI broth and incubated in a shaking incubator at 150 rpm overnight at 37° C.

The strains were initially inoculated in MRS without agitation as the previous strains, but did show only weak growth.
*B. pumilus* CHCC5042
*B. pumilus* CHCC15512
*B. pumilus* CHCC15544
*B. pumilus* CHCC16735
*B. pumilus* CHCC16873
*B. pumilus* CHCC17513
*B. subtilis* CHCC16871

CHCC4895 was inoculated in M17+2% lactose and incubated at 37° C. overnight.

The overnight cultures were centrifuged and the pellets were resuspended in 1 Vol. of B-milk.

For the acidification experiment the resuspended strains were inoculated 1% each in 200 ml B-milk. Acidification was followed at 37° C. in a water bath by measuring the pH with the PC logger overnight.
1. 1% CHCC4895
2. 1% CHCC4895+1% CHCC5042 (*pumilus*)
3. 1% CHCC4895+1% CHCC15512 (*pumilus*)
4. 1% CHCC4895+1% CHCC15544 (*pumilus*)
5. 1% CHCC4895+1% CHCC16735 (*pumilus*)
6. 1% CHCC4895+1% CHCC16871 (*subtilis*)
7. 1% CHCC4895+1% CHCC17513 (*pumilus*)
8. 1% CHCC4895+1% CHCC16873 (*pumilus*)
9. 1% CHCC5042
10. 1% CHCC15512
11. 1% CHCC15544
12. 1% CHCC16735
13. 1% CHCC16871
14. 1% CHCC17513
15. 1% CHCC16873
16. B-milk Results:
The results are shown in the FIG. 3 herein.
All *Bacillus* strains were able to enhance the acidification activity of CHCC4895 significantly. PH of 5.0 was reached two hours earlier compared to the incubation of CHCC4895 alone. At the same time they were not acidifying milk at all, meaning the pH decrease in co-fermentation is not due to acid production by *B. subtilis*, but rather a growth stimulation effect.

Growth Stimulation of Five Strains from *S. thermophilus* by the Addition of Strains from *Bacillus pumilus* and *B. subtilis*

In this experiment the acidification activity of five additional strains from *S. thermophilus* was tested in the presence of two strains from *B. subtilis* and two strains from *B. pumilus*. The five *S. thermophilus* strains are characterized by having different acidification activities in milk.

*S. thermophilus* strains:
CHCC3175
CHCC4460
CHCC5389
CHCC6592
CHCC9204

*Bacillus* sp. strains:
CHCC15877 (*subtilis*)
CHCC16871 (*subtilis*)
CHCC5042 (*pumilus*)
CHCC16735 (*pumilus*)

*Bacillus* sp. strains were incubated overnight in BHI broth at 37° C. with agitation at 150 rpm.

*S. thermophilus* strains were incubated overnight in M17+2% lactose at 37° C.

The overnight cultures were centrifuged and the pellets were resuspended in 1 Vol. of B-milk.

For the acidification experiment the resuspended strains were inoculated 1% each in 200 ml B-milk. Acidification was followed at 37° C. in a water bath by measuring the pH with the PC logger overnight.

Results:
The results demonstrated that all four *Bacillus* strains were able to enhance the acidification activity of the five *S. thermophilus* strains CHCC3175, CHCC4460, CHCC5389, CHCC6592, and CHCC9204 significantly.

CONCLUSIONS

The result of this Example 3 showed that the addition of strains from *Bacillus subtilis* and *B. pumilus* can stimulate acidification of different strains from *S. thermophilus*.

All *S. thermophilus* strains tested showed an effect when co-fermented with the individual different strains from *Bacillus subtilis* and *B. pumilus*.

Example 4: Growth Stimulation of *Lactobacillus delbrueckii* Ssp. *Bulgaricus* by Co-Fermentation with Strains from *B. pumilus*—One-Step Fermentation Method of the Invention Growth stimulation of five strains from *Lactobacillus delbrueckii* ssp. *bulgaricus* by the addition of strains from *Bacillus pumilus*

Inoculation of *B. pumilus* 5042sc and 16735sc (single colony isolates, see above; from ON culture) in 3×5 ml BHI broth. Incubation at 150 rpm, 37° C.

Inoculation of *Lactobacillus delbrueckii* ssp. *bulgaricus* CHCC3984 in 9 ml MRS.

The *Bacillus pumilus* ON cultures were pooled, 12 ml was centrifuged, and the pellets were resuspended in 12 ml B-milk each.

The *Lactobacillus bulgaricus* strains were centrifuged and resuspended in 9 ml B-milk.

Acidification Experiment:
1% inoculation in 200 ml B-milk. Acidification at 37° C. in water-bath. PH was measured by the PC logger ON.
1. 3984
2. 3984+5042

3. 3984+16735
4. B-milk

Results:

Both of tested *Bacillus pumilus* strains had a significant growth promoting effect for *Lactobacillus delbrueckii* ssp. *bulgaricus* CHCC3984. When the *Bacillus* cells were co-cultured with the *Lactobacillus delbrueckii* ssp. *bulgaricus* strain the pH=5 was reached significantly faster as compared to the control experiment (i.e. with only CHCC3984).

Example 5: Growth Stimulation of *Lactococcus lactis* by Co-Fermentation with Strains from *B. pumilus*—One-Step Fermentation Method of the Invention Growth Stimulation of Five Strains from *Lactococcus lactis* by the Addition of Strains from *Bacillus pumilus* and *B. subtilis*

Inoculation of *B. pumilus* 5042 and 16735 (from frozen ampoules) in 3×5 ml BHI broth. Incubation at 150 rpm, 37° C.

Inoculation of the *Lactococcus lactis* strains CHCC2281, CHCC4427, CHCC9867, CHCC3949 and CHCC3950 in M17. 1% glucose was added to 3949 and 3950 which are lactose negative. Incubation at 30° C. ON.

The *B. pumilus* ON cultures were pooled, 11 ml was centrifuged, and the pellets were resuspended in 11 ml B-milk each.

The *Lactococcus lactis* strains were centrifuged and resuspended in 1 volume B-milk.

Acidification Experiment: 1% inoculation in 200 ml B-milk. Acidification at 30° C. in water-bath. PH was measured by the PC logger ON.

1. 2281
2. 2281+5042
3. 2281+16735
4. 4427
5. 4427+5042
6. 4427+16735
7. 9867
8. 9867+5042
9. 9867+16735
10. 3949+1% glucose
11. 3949+5042+1% glucose
12. 3949+16735+1% glucose
13. 3950+1% glucose
14. 3950+5042+1% glucose
15. 3950+16735+1% glucose
16. B-milk Results:

The results showed that *Lactococcus lactis* strains are acidifying a bit faster when growing together with the *Bacillus pumilus* strains. The impact was, however, not as big as we have seen for some of the *S. thermophilus* strains (see Examples above).

One of the reasons to have selected *Lactococcus lactis* CHCC3949 and CHCC3950 in this experiment was the theory that the proteolytic system of the *B. pumilus* strains is responsible for the growth promoting effect. CHCC3949 and CHCC3950, which are proteinase negative, should in theory then benefit relatively more than the other tested *Lactococcus lactis* strains (i.e. CHCC2281, CHCC4427, CHCC9867) from co-culturing with *B. pumilus*.

However, in this experiment, the growth of CHCC3949 and CHCC3950 was not much enhanced as compared to the other tested *Lactococcus lactis* strains.

Example 6: Screening for Suitable *Bacillus* Strains—One-Step Fermentation Method of the Invention In this Example was screened for *Bacillus* cells that give improvement of acidification activity compared to use of the LAB strains alone.

Screening in 96-Well Plates with 1 ml Milk

*S. thermophilus* (ST) strain CHCC12339 (exopolysaccharide (EPS) producing strain) was chosen for the screening.

The screening was done in 96-well plates with 1 ml milk and 156 different *Bacillus* strains were tested selected from the following *Bacillus* species: *Bacillus amyloliquefaciens, Bacillus aryabhattai, Bacillus atrophaeus, Bacillus clausii, Bacillus coagulans, Bacillus flexus, Bacillus fusiformis, Bacillus lentus, Bacillus licheniformis, Bacillus megaterium, Bacillus methylotrophicus, Bacillus mojavensis, Bacillus pumilus, Bacillus safensis, Bacillus siamensis, Bacillus simplex, Bacillus subtilis, Bacillus tequilensis* and *Bacillus vallismortis*.

Acidification time and texture were measured. Texture was measured using TADM technology. Overall, the results demonstrated that the majority of the *Bacillus* cells worked—i.e. they gave improvement of acidification activity (speed) and texture compared to use of the LAB strains alone. In particular, 135 of the tested *Bacillus* strains resulted in a higher acidification speed as compared to the ST strain alone, and 60 of the tested strains had an improved texture as compared to the ST strain alone. Acidification by the ST itself was slow, up to 14 hours or more for pH 6 to 4.5. Addition of *Bacillus* reduced the acidification time significantly to as low as 2-4 hours for the fastest strains.

Results from 200 ml Bottles

The verified candidates (from the 96-well plates screening) were tested in 200 ml bottles with milk. Acidification time and texture was measured. Samples were taken for sugar consumption, production of small acids and volatiles. The 200 ml bottles were stored for 4 weeks in the fridge; synersis, smell and volatiles were analyzed again. Growth of *Bacillus* in milk was also followed.

The shear stress measurements showed that the Lb strain CHCC12945 had up to 73% higher texture when the *Bacillus* strain CHCC15176 was added in milk compared to the Lb strain alone. A *Bacillus* strain isolated from a soy bean product *natto* gave 40% higher texture in combination with the Lb strain compared to the Lb strain alone. The three ST strains had however not much better texture with *Bacillus* added compared to the ST strains alone in milk. Two different starter cultures, CH-1 and a Sweety starter culture has shown increased texture with 23% when *Bacillus* was added to milk.

Acidification in milk with LAB strains and *Bacillus* had shorter acidification times than with LAB strains alone. In 1 ml scale, the decrease in acidification time from pH 6 to pH 4.5 was up to 6 hours for the best combinations (Lb CHCC12945 with *Bacillus*). But also the fast acidifying ST strain CHCC15915 had a decrease in acidifying time from 4.35 to 3 hours with *Bacillus*. In 200 ml bottles, the decrease was 4 hours in acidification time for the best combinations (Lb CHCC12945 and *Bacillus* CHCC18102 isolated from *natto*).

Growth of *Bacillus* in milk was investigated. The *Bacillus* strains tested in this project did not grow in milk, with or without LAB added. *Bacillus* needs oxygen for growth.

The standard procedure for acidification is inoculation of bacteria in 200 ml milk in a 200 ml bottle. Then the bottle stands still in a water bath or in an incubator without stirring.

There was a tendency that the *Bacillus* vegetative cells declined faster when a LAB strain was present. Most of the *Bacillus* strain in milk produced spores, but sporulation was also inhibited by the presence of LAB.

*Bacillus* boosted acidification and growth of both Lb CHCC12945 and ST CHCC12561 compared to the LAB strains alone. The final CFU/ml of LAB was up to the double compared to the LAB strains alone in milk.

For the individual LAB strains the results were:

Lb; CHCC12945.

The acidification was much faster with some of the *Bacillus* added to the Lb fermentations. The time from pH 6 to pH 4.5 was reduces from 8 hours for the Lb alone down to a bit more than 2 hours for the fastest combinations.

ST2; CHCC12561 (slow)

Acidification; the acidification was improved from 6 hours for the ST2 itself, down to 4 hours for the best combinations of *Bacillus* and ST2.

ST3; CHCC15915 (fast)

Acidification by this ST3 gave nice and smooth acidification curves. Some of the combinations with *Bacillus* seemed to fasten acidification from pH 6 to pH 4.5 compared to the ST3 alone.

In order to evaluate the effect of adding *Bacillus* to LAB strains in milk, samples for sugars, volatiles and small acids were measured. No major differences could be seen between when *Bacillus* was added or not.

To evaluate storage bottles with fermented milk were stored for 4 weeks in the fridge and samples for volatiles were measured. The fermented milk smelled good, and the volatile profile was almost the same compared to after 1 day of storage. In short, during storage fermented milk with *Bacillus* did not evolve differently compared to fermented milk with only LAB added.

CONCLUSIONS

The result of this example demonstrated during storage fermented milk with *Bacillus* did not evolve differently compared to fermented milk with only LAB added.

Accordingly, the one-step fermentation method of the present invention gives a commercially relevant fine fermented milk product—as discussed above, the two-step method of the prior art did not work properly.

For all the tested LAB strains (one *Lactobacillus* (Lb) and three different *S. thermophilus* (ST) strains)—there were found properly working candidates from at least the following different *Bacillus* species: *B. subtilis, B. licheniformis, B. pumilus, B. amylioliquefaciens, B. megaterium* and others.

Example 7: Growth Stimulation of *S. thermophilus* CHCC4460 with Different Concentrations of *Bacillus pumilus* CHCC16735—One-Step Fermentation Method of the Invention

*S. thermophilus* CHCC4460 was inoculated in 15 ml M17+2% lactose and incubated at 37° C. overnight (ON).

*Bacillus pumilus* CHCC5042 was inoculated in BHI broth and incubation over night at 37° C., 200 rpm.

For the acidification experiment 15 ml CHCC4460 ON culture was centrifuged and the pellet was re-suspended in 15 ml B-milk.

6 ml CHCC16735 ON culture was centrifuged and the pellet was re-suspended in 6 ml B-milk.

CHCC4460 was inoculated alone 1% in B-milk and in co-culture with different concentrations of CHCC16735 according to the following scheme.

The 1% inoculation of CHCC16735 would result in a concentration of ca. $6 \times 10^6$ cfu/ml at the beginning of the milk fermentation.

1. 1% CHCC4460
2. 1% CHCC4460+1% CHCC16735
3. 1% CHCC4460+0.1% CHCC16735
4. 1% CHCC4460+0.01% CHCC16735
5. 1% CHCC4460+0.001% CHCC16735
6. 1% CHCC4460+0.0001% CHCC16735
7. B-milk control Acidification was followed at 37° C. in a water bath by measuring the pH with the PC logger overnight.

Results:

The results are shown in FIG. 4 herein.

The addition of *Bacillus subtilis* CHCC16735 corresponding to an inoculation percentage of 1% and 0.1% was leading to an increase of acidification activity of CHCC4460. Lower inoculation percentages of CHCC16735 were not resulting in growth stimulation for CHCC4460.

CONCLUSIONS

The result of this Example demonstrated that inoculating milk with around $6 \times 10^5$ cfu/ml of *Bacillus* bacteria in step (a) of the method of the first aspect as described herein work acceptable.

It worked better with around $6 \times 10^6$ cfu/ml of *Bacillus* bacteria.

Based on these results—it is believed that the method of the first aspect as described would not work at a commercially acceptable level by using less than around $10^4$ cfu/ml of *Bacillus* bacteria in step (a) of the method of the first aspect as described herein.

In fact it seems as it would be highly preferred to use at least $10^5$ cfu/ml of *Bacillus* bacteria in step (a) of the method of the first aspect.

Example 8: Pre Co-Culturing of ST and *Bacillus*

In this experiment the same strains *Bacillus pumilus* CHCC5042, CHCC16735 and *S. thermophilus* CHCC4460 were used as in Example 1 above.

As discussed in Example 1—in this example the overnight (ON) cultures in BHI were centrifuged and the pellets were each resuspended in the milk.

As discussed below—in this example the *S. thermophilus* strain was pre-incubated with the *B. pumilus* strains, and the ON cultures were afterwards used in a second step to inoculate milk. The ON cultures were used as such (i.e. not centrifuged). An improved more rapid lowering of pH was obtained.

*S. thermophilus* CHCC4460 was inoculated in 15 ml M17+2% lactose and incubated at 37° C. ON.

*Bacillus pumilus* CHCC5042 and CHCC16735 were inoculated in BHI broth and incubation ON at 37° C., 200 rpm.

From ON cultures 0.5% inoculation of CHCC4460 together with 0.5% inoculation of CHCC5042, resp. CHCC16735, were made in M17+2% lactose.

Incubation of the co-cultures was made at 37° C. ON without shaking.

CHCC4460 was again inoculated from a frozen stock in 15 ml M17+2% lactose and incubated ON at 37° C., and CHCC5042 and CHCC16735 were again inoculated from a frozen stock 10 ml BHI and incubated at 37° C., 200 rpm ON.

Acidification Experiment:

15 ml CHCC4460 ON culture was centrifuged and the pellet was re-suspended in 15 ml B-milk.

6 ml CHCC5042 and 6 ml CHCC16735 ON culture were centrifuged and the pellets were each re-suspended in 6 ml B-milk.

The two co-cultures were not centrifuged. They were inoculated directly 1% in 200 ml B-milk from the preincubated co-cultures.

As control CHCC4460 was also inoculated directly 1% in 200 ml B-milk from ON-culture.

1. 1% CHCC4460 from ON-culture
2. 1% CHCC4460/CHCC5042 from pre co-culture
3. 1% CHCC4460/CHCC16735 from pre co-culture
4. 1% CHCC4460, centrifuged and re-suspended
5. 1% CHCC4460+1% CHCC5042, both centrifuged and re-suspended
6. 1% CHCC4460+1% CHCC16735, both centrifuged and re-suspended
7. B-milk control Results:

The results are shown in the FIG. 5 herein.

The pre-incubation of CHCC4460 with CHCC5042/CHCC16735 is resulting in improved acidification activity compared to inoculating CHCC4460 alone from ON culture.

When the pre-incubated co-cultures where centrifuged and resuspended in B-milk and from there inoculated 1% in B-milk the acidification activity was also increased compared to CHCC4460 centrifuged and resuspended in milk as single strain culture.

In the pre-incubated culture CHCC4460+CHCC16735 after ON growth it was measured a titer of $9 \times 10^4$ Bacillus cells. After inoculation of this pre-culture and incubation in milk ON (second day of fermentation) it was measured a titer of $1 \times 10^3$ Bacillus cells.

CONCLUSIONS

The result of this Example further demonstrated the herein described positive effect of co-culturing Bacillus and LAB cells together. A strong increase of acidification activity is seen when the Bacillus cells are pre-incubated with S. thermophilus before the culture is used to inoculate milk, independent whether the co-culture is used directly for inoculation, or the co-culture is centrifuged and then resuspended in milk before inoculation (which would eliminate a carry-over of growth medium from the first day).

Example 9: S. thermophilus Co-Fermentation with Different Bacillus Strains—One-Step Fermentation Method of the Invention Texture Synergy Two Bacillus strains from the Japanese product Natto were isolated and deposited as CHCC18102 and CHCC18103. On plates, CHCC18102 was slimier than CHCC18103, indicating production of γ-PGA, a polymer of glutamate. The idea was that the Bacillus strains could contribute to the texture in milk. The two Bacillus strains were inoculated into milk together with an ST strain (CHCC16404, acidifying slowly and producing glucose). Both strains were inoculated 1% of washed over night culture. After acidification for 24 hours in 1 ml B-milk, texture was measured with the TADM technique at the Hamilton robot. The results clearly showed that the texture was different when the two Bacillus strains were added to ST in milk, which showed a clear increase in texture when co-acidifying milk with these two Bacillus strains.

In growth experiments in minimal medium, CHCC18102 and CHCC18103 did not grow on lactose or glucose. When the two strains were added in milk together with the Sweety ST, the excreted glucose was not used by the two Bacillus strains. Analysis data (small acids, volatiles, sugars) showed that the Bacillus strains did not contribute in a significant way to the overall chemical composition and metabolites produced in the fermented milk since the Bacillus strains did not show growth. CHCC18102 contributed more to the texture than CHCC18103. The question still remains how the Bacillus strains contribute to the texture in fermented milk.

We hypothesize that increased texture could be due to the ability of Bacillus to produce of γ-PGA, biofilm or by boosting acidification and growth of the ST.

Acidification Synergy in Milk

Acidification in milk is an important factor, since faster acidification can save time for the producer of fermented milk products, and/or one could sell fewer bacteria with the same activity. Adding different Bacillus strains (OD 0.02) into milk together with a 0.024% starter culture (containing CHCC16404, ST-16731, ST-15757 and LBA-bu16159) showed beneficial effects for acidification for 4 strains. The acidification started cold, which explains the long acidification times.

TABLE 1

Bacillus strains used in the acidification experiment.

| CHCC-number | Bacillus species |
| --- | --- |
| CHCC15396 | B. sonorensis |
| CHCC15146 | B. mojavensis/subtilis/tequilensis |
| CHCC18102 | Bacillus from natto |
| CHCC18103 | Bacillus from natto |

The important time point is "time to pH 4.55". The two Bacillus strains CHCC18102 and CHCC18103 both reach pH 4.55 faster than the starter culture alone. The fastest culture with CHCC18102 reached pH 4.55 45 minutes before the pure starter culture. The cultures with CHCC18103 and CHCC15146 reached pH 4.55 25 minutes before the pure starter culture. The culture with CHCC15396 reached pH 4.55 15 minutes before the pure starter culture. It showed that different Bacillus strains could be beneficial to the starter culture regarding acidification.

In another experiment, a Bacillus strain, B. pumilus A650-3, isolated from rawmilk, was able to stimulate acidification activity of different ST production strains. The ST strains and the B. pumilis strain were inoculated with 1% from overnight culture.

Vitamin K

Bacillus subtilis "Natto" is known for producing vitamin K, especially in the fermented Japanese soy bean product Natto. In this experiment, we added the two Bacillus strains isolated from Natto with and without a ST strain (CHCC16404, the same as in the texture experiment) in 200 ml milk for 24 hours at 37° C. The results showed that both Bacillus strains could produce vitamin K, independently of the ST strain. The level was 6-7 µg/100 ml fermented milk for CHCC18102, and ~9 µg/100 ml fermented milk for CHCC18103, see Table 2. The Bacillus strains produced mostly MK-4 and MK-7, but also a little amount of K1 (MK-4, MK-7 and K1 are different types of Vitamin K). The ST strain did not contribute to the vitamin K levels.

TABLE 2

Vitamin K production in milk with CHCC18102 and CHCC18103 with and without a ST strain, μg/100 fermented milk.

| CHCC | K1 | MK-4 | MK-7 | Total |
|---|---|---|---|---|
| 18102 | 0.33 | 1.02 | 5.97 | 7.32 |
| 18102 + ST | 0.27 | 1.02 | 4.73 | 6.02 |
| 18103 | 0.27 | 1.11 | 7.93 | 9.31 |
| 18103 + ST | 0.3 | 0.99 | 8.15 | 9.44 |

CONCLUSIONS

Co-inoculation of the two *Natto Bacillus* strains with *S. thermophilus* (ST) yielded several interesting results:

Vitamin K production of 6-9 μg/100 ml fermented milk

Increase in texture performance in fermented milk (TADM values of −5500 Pa vs −12000 Pa)

Increase in acidification speed by 45 min (time to pH 4.55)

The *B. pumilus* strain was shown to promote growth of ST CHCC4895 significantly, while the *B. pumilus* strain alone did not acidify in milk.

REFERENCES

1. US2009/0011081A1.
2. U.S. Pat. No. 5,077,063.
3. CN103300147A.
4. ROSSLAND, E., LANGSRUD, T. and SORHAUG, T., 2005. Influence of controlled lactic fermentation on growth and sporulation of *Bacillus cereus* in milk. International journal of food microbiology, 103(1), pp. 69-77.
5. The European Union (EU) European Food Safety Authority (EFSA) Panel on Biological Hazards (BIOHAZ) Scientific Opinion on the maintenance of the list of QPS biological agents intentionally added to food and feed (2013 update). The citation reference is "EFSA Journal 2013; 11(11):3449 [108 pp.]. doi:10.2903/j.efsa.2013.3449" and at the filing date of the present application it could be downloaded via following link: http://www.efsa.europa.eu/en/efsajournal/doc/3449.pdf

The invention claimed is:

1. A composition for producing a lactic acid bacteria fermented milk product comprising a starter culture comprising (a) lactic acid bacteria (LAB) selected from one or more of *Streptococcus thermophilus*, *Lactobacillus delbrueckii* ssp. *bulgaricus*, and *Lactococcus lactis*, and (b) *Bacillus* bacteria selected from one or more of *Bacillus amyloliquefaciens*, *Bacillus aryabhattai*, *Bacillus atrophaeus*, *Bacillus clausii*, *Bacillus coagulans*, *Bacillus flexus*, *Bacillus fusiformis*, *Bacillus lentus*, *Bacillus licheniformis*, *Bacillus megaterium*, *Bacillus methylotrophicus*, *Bacillus mojavensis*, *Bacillus pumilus*, *Bacillus safensis*, *Bacillus siamensis*, *Bacillus simplex*, *Bacillus sonorensis*, *Bacillus subtilis*, *Bacillus tequilensis* and *Bacillus vallismortis*.

* * * * *